United States Patent [19]

Bertsch-Frank et al.

[11] Patent Number: 5,658,873
[45] Date of Patent: Aug. 19, 1997

[54] COATED SODIUM PERCARBONATE PARTICLES, A PROCESS FOR THEIR PRODUCTION AND DETERGENT, CLEANING AND BLEACHING COMPOSITIONS CONTAINING THEM

[75] Inventors: Birgit Bertsch-Frank, Rheinfelden; Claas-Juergen Klasen, Freigericht; Thomas Lieser, Hapau; Klaus Mueller, Hasselroth; Martin Bewersdorf, Gelnhausen, all of Germany

[73] Assignee: Degussa Aktiengesellschaft, Frankfurt, Germany

[21] Appl. No.: 525,782

[22] PCT Filed: Feb. 28, 1994

[86] PCT No.: PCT/EP94/00576

§ 371 Date: Oct. 2, 1995

§ 102(e) Date: Oct. 2, 1995

[87] PCT Pub. No.: WO94/24044

PCT Pub. Date: Oct. 27, 1994

[30] Foreign Application Priority Data

Apr. 10, 1993 [DE] Germany ............... 43 11 944.1

[51] Int. Cl.⁶ .................... C11D 3/39; C11D 3/395; C11D 17/06
[52] U.S. Cl. ............... 510/375; 252/186.26; 252/186.27; 423/275; 423/281; 423/328.2; 423/415.2; 510/441; 510/442; 427/215
[58] Field of Search ................ 252/186.26, 186.27; 423/275, 281, 328.2, 415.2; 510/375, 441, 442; 427/215

[56] References Cited

U.S. PATENT DOCUMENTS

| | | | |
|---|---|---|---|
| 1,978,953 | 10/1934 | McKeown | 423/281 |
| 3,327,684 | 6/1967 | Pistor | 8/111 |
| 4,156,039 | 5/1979 | Klebe | 427/215 |

FOREIGN PATENT DOCUMENTS

| | | |
|---|---|---|
| 0487256 | 5/1992 | European Pat. Off. |
| 548432 | 4/1932 | Germany. |
| 2417572 | 11/1974 | Germany. |
| 2458326 | 7/1975 | Germany. |
| 2622610 | 12/1976 | Germany. |
| 2652776 | 5/1978 | Germany. |
| 2651442 | 6/1978 | Germany. |
| 2800916 | 7/1978 | Germany. |
| 2712139 | 9/1978 | Germany. |
| 2800760 | 7/1979 | Germany. |
| 2810379 | 9/1979 | Germany. |
| 3321082 | 12/1983 | Germany. |
| 3720277 | 12/1988 | Germany. |

OTHER PUBLICATIONS

Ullmann's Encyclopedia of Industrial Chemistry, Vol. A4 (1985), 5 Edition, pp. 363–280.

*Primary Examiner*—Dennis Albrecht
*Attorney, Agent, or Firm*—Beveridge, DeGrandi, Weilacher & Young, L.L.P.

[57] ABSTRACT

Sodium percarbonate is often used in the form of coated particles to increase its storage stability in detergents.

Sodium percarbonate particles coated in accordance with the invention have a coating containing reaction products from the reaction of a dialkali metal tetraborate or alkali metal pentaborate with aqueous hydrogen peroxide. Preferred coating components are: perborax with the formula $Na_2B_4O_7 \cdot H_2O_2$, where n = 2 or 4.

The coated sodium percarbonate particles are produced by coating the percarbonate particles using a solution containing the reaction products mentioned above.

Detergent, bleaching and cleaning compositions containing sodium percarbonate particles coated in accordance with the invention are distinguished by very high stability in storage.

27 Claims, No Drawings

COATED SODIUM PERCARBONATE PARTICLES, A PROCESS FOR THEIR PRODUCTION AND DETERGENT, CLEANING AND BLEACHING COMPOSITIONS CONTAINING THEM

DESCRIPTION

This invention relates to coated sodium percarbonate particles, of which the coating contains a peroxygen-containing boron compound which imparts high storage stability to the sodium percarbonate. The present invention also relates to a process for the production of the coated sodium percarbonate particles by application of one or more coating components, more particularly in the form of an aqueous solution containing them, to the sodium percarbonate to be coated and to detergent, cleaning and bleaching compositions containing coated sodium percarbonate particles according to the invention.

Sodium percarbonate (2 $Na_2CO_3 \cdot 3H_2O_2$) is used as an active oxygen component in detergents, bleaches and cleaning preparations. In view of the inadequate storage stability of sodium percarbonate in a humid environment and in the presence of various components of detergents and cleaning preparations, sodium percarbonate has to be stabilized against the loss of active oxygen ($O_a$). A key principle for stabilization is to surround the sodium percarbonate particles with a coating of stabilizing components. Thus, it is known that sodium percarbonate can be coated with paraffin or polyethylene glycol. Unfortunately, adequate long-term stability is not achieved in this way, in addition to which solubility in water is undesirably reduced. Even the application of a coating of alkali metal silicate to the sodium percarbonate particles, as proposed in DE-OS 26 52 776, does not lead to adequate stabilization and, in addition, introduces an unwanted content of insoluble constituents. In the processes known from DE-OS 24 17 572 and DE-OS 26 22 610, sodium sulfate and sodium carbonate or sodium sulfate, sodium carbonate and sodium silicate are used as coating components. In these processes, a solution of the coating components is sprayed onto sodium percarbonate particles in a fluidized bed dryer. Adequate stabilization requires a large quantity of coating material which in turn leads to a correspondingly large reduction in the active oxygen content.

Although it is known from DE-PS 28 00 916 that a coating material containing at least one boron compound from the group consisting of metaboric acid, orthoboric acid and tetraboric acid can be used for stabilizing sodium percarbonate, the stabilizing effect obtained in this way is described as inadequate in DE-OS 33 21 082, as demonstrated in the Comparison Examples. Instead, sodium percarbonate with a shell containing sodium borate is described as advantageous. However, as the inventors of the present application discovered when copying the Examples of DE-OS 33 21 082, the borate and, optionally, other coating components—to achieve adequate stability—had to be present in the coating in such a quantity that the available active oxygen content of the sodium percarbonate thus stabilized was always below 14% by weight. A further development of stabilization using borates is described in EP-A 0 487 256, although the coating process disclosed therein involves at least two stages and is therefore technically complicated.

Finally, DE-AS 24 58 326 describes a process for stabilizing sodium percarbonate, the storage stability of the pure product being increased, even in admixture with cleaning preparations. In this process, the sodium percarbonate is coated with a hydrophobic liquid organic compound to which sodium perborate powder is added. The disadvantage of this process lies in the need to use a hydrophobic liquid organic compound which has to be diluted with a lower alcohol in the interests of better handling. In addition, the quantities in which the coating chemicals are used, namely 5 to 20% by weight of sodium perborate and 5 to 10% by weight of hydrophobic organic compound, based on sodium percarbonate, are very high.

Coated sodium percarbonate particles consisting of a sodium percarbonate core and a coating of sodium perborate with the general formula $NaBO_2 \cdot H_2O_2 \cdot n\ H_2O$, where n is <3, are known from DE-PS 26 51 442. According to DE-PS 27 12 139, the coating may additionally contain sodium silicate and other water-binding substances. To produce the coated sodium percarbonate particles mentioned, sodium percarbonate is first wetted with water or an aqueous sodium silicate solution in such a small quantity that the sodium perborate is not converted into the tetrahydrate and is subsequently covered with anhydrous sodium perborate. A further development of the process outlined above is described in DE-PS 28 10 379 and comprises spraying sodium percarbonate with an aqueous solution of sodium perborate containing 50 to 500 g of sodium perborate tetrahydrate per liter of solution at 40° to 60° C. and with a sodium silicate solution and then completely or partly removing the water introduced.

As disclosed in hitherto unpublished German patent application P 43 06 399.3, the process described above can be considerably simplified by washing sodium percarbonate produced by the wet method with a solution containing sodium perborate ($NaBO_2 \cdot H_2O_2$) in a solid/liquid separator after at least partial separation of the mother liquor. Despite the small quantity of coating required, high active oxygen stability is achieved in storage of the sodium percarbonate in admixture with a typical zeolite-containing detergent tower powder.

A coating containing perborate monohydrate or tetrahydrate has the advantage over a coating of sodium percarbonate with borates or boric acid that the active oxygen content of the sodium percarbonate particles is hardly affected.

The problem addressed by the present invention was further to improve the stabilization of sodium percarbonate using new peroxygen-containing boron compounds and to provide new coated sodium percarbonate particles which, for the same boron content, would guarantee higher active oxygen stability in storage in admixture with detergent constituents than known sodium percarbonate particles having a perborate-containing coating.

Accordingly, the present invention relates to coated sodium percarbonate particles consisting of a core of, essentially, sodium percarbonate and a coating containing at least one peroxygen-containing boron compound, characterized in that one or more reaction products from the reaction of a dialkali metal tetraborate or alkali metal pentaborate with aqueous hydrogen peroxide are present as the peroxygen-containing boron compound.

The core of the coated particles consists essentially of sodium percarbonate. By "essentially" is meant that the sodium percarbonate may contain secondary constituents from its production, such as for example soda and small quantities of sodium chloride and also crystallization retarders, for example a metaphosphate or a polycarboxylic acid and typical stabilizers, such as for example magnesium salts and sodium silicate. The term "essentially" also includes sodium percarbonate which already contains a coating of stabilizing components, for example selected from the group of phosphonates, phosphates, soda, waterglass, magnesium salts, aminocarboxylates and aminophosphonates and also polymeric hydroxycarboxylates. In principle, any coating components already present may even be known boron compounds, although this does appear to be inappropriate where coated sodium percarbonate particles of low boron content are to be produced.

The sodium percarbonate to be used in the process according to the invention may have been produced by a standard process. Standard production processes include in particular so-called wet processes in which soda and hydrogen peroxide are reacted in aqueous phase and sodium percarbonate is crystallized; and so-called spray processes in which an aqueous solution containing soda and hydrogen peroxide is sprayed onto sodium percarbonate particles in a fluidized bed dryer; and so-called dry processes in which a concentrated hydrogen peroxide solution is reacted with anhydrous soda. If desired, a standard production process may be followed by a standard coating process.

In their stabilizing shell, the coated sodium percarbonate particles according to the invention contain peroxygen-containing reaction products which emanate from the reaction of a dialkali metal tetraborate or alkali metal pentaborate with aqueous hydrogen peroxide and which are completely or partly freed from water under standard drying conditions of correspondingly coated sodium percarbonate particles. The drying and water removal phases may be accompanied by melting processes.

It is not yet known whether the resulting peroxygen-containing boron compounds are pure adducts of hydrogen peroxide with the tetraborate or pentaborate or compounds containing the structural element —B—O—O—H or —B—O—O—B—. It may even be possible that the peroxygen-containing tetra- and pentaborate(s) undergo partial disproportionation during the production-related drying process, so that a boric acid and a perborate containing the structural element:

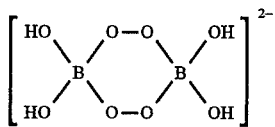

known from so-called sodium perborate monohydrate may be present alongside one another in the coating.

According to Ullmann's Encyclopedia of Industrial Chemistry, 5th Edition (1985), Vol. A4, 270, the tetraborates and pentaborates used for the formation of the peroxygen-containing boron compounds mentioned above have the following anion structure:

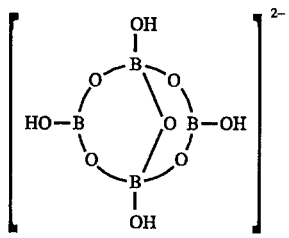

-continued

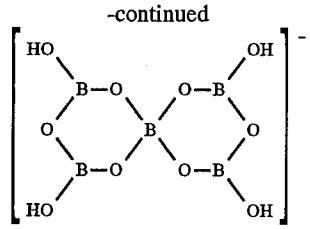

The tetraborate and pentaborate contain lithium, sodium or potassium as cation, sodium being preferred.

Preferred coated sodium percarbonate particles contain a so-called perborax corresponding to the general formula $Na_2B_4O_7 \cdot n\,H_2O_2 \cdot m\,H_2O$, where n is an integer of 1 to 4 and m is an integer of 0 to 9, as the peroxygen-containing boron compound in the coating. Two to 4 mols of hydrogen peroxide and 0 to 2 mols of water are preferably bound per mol of tetraborate. In a particularly preferred embodiment, the coating essentially contains $Na_2B_4O_7 \cdot 4H_2O_2$.

In addition to the peroxygen-containing perboron compounds according to the invention, such as in particular perborax corresponding to the general formula $Na_2B_4O_7 \cdot 4H_2O_2$, the coating may additionally contain other known stabilizing coating components in uniform distribution, for example those already mentioned in the preamble. If desired, the coating according to the invention may be surrounded by other layers containing other stabilizers than the peroxygen-containing perboron compounds used in accordance with the invention and optionally by other layers containing individual constituents of typical detergent and cleaning compositions, for example zeolites. These additional layers may have been applied to the sodium percarbonate particles coated in accordance with the invention by standard methods, i.e. in particular by spray, mixing and granulation processes.

The sodium percarbonate particles coated in accordance with the invention may contain widely varying quantities of coating material. Although quantities of 1 to more than 30% by weight, based on sodium percarbonate, are possible, quantities of 1 to 10% by weight and preferably 2 to 6% by weight of coating material have proved to be advantageous in practice. On the one hand, these limited quantities provide for adequate stabilization of the sodium percarbonate against losses of active oxygen during storage in humid conditions in the presence of typical detergent, cleaning and bleaching compositions; on the other hand, the boron content of the coated sodium percarbonate remains at a low level.

As already mentioned, the single-layer or multiple layer coating of the sodium percarbonate particles according to the invention may contain other coating components in addition to the reaction products of hydrogen peroxide with a tetraborate or pentaborate. Advantageously, the coating as a whole contains more than 50% by weight and, in particular, more than 70% by weight of the above-mentioned reaction products of hydrogen peroxide with a tetraborate or pentaborate and less than 50% by weight and in particular less than 30% by weight of other stabilizing compounds. Sodium percarbonate particles coated in accordance with the invention with a single coating layer essentially containing only the peroxygen-containing boron compounds to be used in accordance with the invention show an extremely high level of stability in storage in the presence of detergent tower powders which is not achieved where standard perborate is used on its own, despite the same boron content. This is extremely surprising because perborax with the formula $Na_2B_4O_7 \cdot 4H_2O_2$ is less stable as such than sodium perborate monohydrate for example.

The sodium percarbonate particles coated in accordance with the invention may be obtained by application of at least one peroxygen-containing boron compound and, if desired, other coating components, preferably using an aqueous solution containing the coating components, to particles consisting essentially of sodium percarbonate and, if necessary, drying the resulting moist particles. The process is characterized in that one or more reaction products from the reaction of a dialkali metal tetraborate or alkali metal pentaborate with aqueous hydrogen peroxide is used as the peroxygen-containing boron compound.

The coating components are preferably applied to the sodium percarbonate particles in the form of one or more aqueous solutions. The reaction mixture from the reaction of a tetraborate or pentaborate with hydrogen peroxide is best directly used.

If desired, the boron compounds containing active oxygen may be recovered from the reaction mixture in the form of a further concentrated solution or even as a solid by partial or complete evaporation of the water present and may be used as such for the process according to the invention. The reaction mixture is best directly prepared in such a way that the desired concentration of peroxygen-containing boron compounds is maintained. By virtue of the high solubility of the reaction products of tetraborates and pentaborates with hydrogen peroxide, highly concentrated solutions of the peroxygen-containing boron compounds are obtained. Solutions such as these have the advantage that, when they are applied to sodium percarbonate particles by a spray nozzle, no blockages of the spray nozzle and hence no malfunctions occur. At the same time, only a small quantity of water has to be removed in the drying process. In the preparation of the reaction mixture, the reactants are used in such a quantity that an atomic ratio of boron to active oxygen of 1:0.2 to 1:1.5 is obtained. However, an atomic ratio of boron to active oxygen of 1:0.5 to 1:1.25 is preferred, an atomic ratio of 1 to substantially 1 being particularly preferred. In a particularly preferred embodiment, the solution to be applied to the sodium percarbonate particles contains a perborax with the general formula $Na_2B_4O_7 \cdot n\ H_2O_2$, where n is an integer of 1 to 4, preferably 2 to 4 and, more preferably, approximately 4. Where a solution containing $Na_2B_4O_7 \cdot 4H_2O_2$ is used, it is of advantage if the solution additionally contains a small excess of hydrogen peroxide corresponding to an atomic ratio of boron to active oxygen of approximately 1:1.05 to 1.15. Solutions such as these may readily be obtained by introducing borax with stirring into an aqueous hydrogen peroxide solution. Solutions containing, for example, 20 to 50% by weight and, more particularly, 25 to 40% by weight of perborax with the formula $Na_2B_4O_7 \cdot n\ H_2O_2$, where n is an integer of 2 to 4, can be prepared in this way for the process according to the invention.

The peroxygen-containing boron compound to be used in accordance with the invention may be continuously or discontinuously applied to particles consisting essentially of sodium percarbonate in one or more stages by standard methods. The particles to be coated may either be dry or may contain residual moisture from their production process. Accordingly, it is even possible to use, for example, centrifuge-moist or partly dried sodium percarbonate. Coated sodium percarbonate particles according to the invention may be obtained by mixing surface-moist sodium percarbonate with powder-form perborax and, if necessary, subsequent drying. However, it is of greater advantage to apply a solution of the coating components to sodium percarbonate particles. Suitable processes are, for example: spraying a solution onto the particles with simultaneous mixing; suitable mixers are, for example, spray mixers, such as rotating tubes, tumble mixers, pan granulators. In an alternative to the embodiment mentioned above, sodium percarbonate produced in a wet process is treated with an aqueous solution containing a peroxygen-containing boron compound according to the invention in a washing installation, for example a solid/liquid separator, and the product thus treated is dried after the removal of excess solution. This embodiment corresponds to the embodiment according to hitherto unpublished German patent application P 43 06 399.3 except that a solution containing sodium perborate ($NaBO_2 \cdot H_2O_2$) is used in the process according to the earlier application. In one particularly advantageous embodiment of the process according to the invention, the aqueous solution is sprayed onto the particles to be coated in a fluidized bed in which the particles are kept in a fluidized state. The particles moistened with the solution sprayed on are simultaneously or subsequently dried. Where a fluidized bed arrangement is used, spraying and drying may be carried out at the same time by using air heated to the drying temperature for fluidization.

The solution containing the peroxygen-containing boron compounds to be used in accordance with the invention and optionally other coating components may be at room temperature or at a temperature of up to about 60° C. during the spraying process. Where particularly highly concentrated solutions are used, it is best to heat them, preferably to a temperature of 30° to 50° C. Where the solution to be used is prepared from a tetraborate or pentaborate and hydrogen peroxide, the temperature of the solution immediately before it is used will be approximately in the range mentioned under the effect of the heat of solution and the heat of reaction. Instead of preparing the solution from the reactants, it may also be produced by dissolving perborax with the empirical formula $Na_2B_4O_7 \cdot 4H_2O_2$, as described for example in DE-PS 548 432, in water; up to 1 kg perborax can be dissolved in 1 liter of water at room temperature.

The moist coated sodium percarbonate obtained by spraying is dried under conditions typically applied in the drying of sodium percarbonate. Accordingly, the drying temperature is in the range from 30° to 90° C., preferably in the range from 50° to 80° C. and more preferably in the range from 50° to 70° C. The drying temperature is understood to be the temperature of the particles to be dried. Accordingly, in the particularly preferred embodiment where the process is carried out in a fluidized dryer, the fluidized bed temperature is in the above-mentioned temperature range. The temperature at which the drying gas enters the fluidized dryer will therefore be above the fluidized bed temperature.

The sodium percarbonate particles coated in accordance with the invention may be used as bleaching component in detergents, cleaning and bleaching compositions. Detergent, cleaning and bleaching compositions containing sodium percarbonate particles coated in accordance with the invention are distinguished by the fact that the sodium percarbonate present therein has an unexpectedly high storage stability, so that there is only a very gradual loss of active oxygen during the storage of such compositions under typical conditions. The storage stability of sodium percarbonate coated in accordance with the invention in the compositions mentioned exceeds the level obtained with known coated sodium percarbonate particles for comparable quantities of coating material and a high starting $O_a$ content.

The detergent, cleaning and bleaching compositions containing sodium percarbonate coated in accordance with the invention consist of 1 to 99% by weight of the coated sodium percarbonate and, for the rest (balance to 100% by weight), of other typical components of such compositions. Whereas the content of sodium percarbonate in detergents generally does not exceed 20% by weight, it may be distinctly higher in bleaching and cleaning compositions.

The detergent, cleaning and bleaching compositions containing sodium percarbonate coated in accordance with the invention contain other components typical of such compositions in the usual concentrations in addition to the active oxygen compound mentioned above. The other components in question include in particular 1. surfactants from the group of cationic, anionic, nonionic, amphoteric or ampholytic surfactants;
2. inorganic and/or organic builders of which the main function is to sequester or complex the metal ions responsible for the hardness of water, for example zeolites, polyphosphates, aminopolyacetic acids and aminopolyphosphonic acids and also polyoxycarboxylic acids;
3. alkaline and inorganic electrolytes, such as for example alkanolamines and silicates, carbonates and sulfates;
4. bleach activators from the group of N-acyl compounds and O-acyl compounds, for example tetraacetyl ethylenediamine (TAED);
5. other constituents of the compositions may be stabilizers for peroxides, such as in particular magnesium salts, redeposition inhibitors, optical brighteners, foam inhibitors, enzymes, disinfectants, corrosion inhibitors, fragrances, dyes and pH regulators. Particulars of individual compounds belonging to classes 1 to 5 can be found, for example, in DE-OS 33 21 082, pages 14–30.

The sodium percarbonate particles coated in accordance with the invention show surprisingly high active oxygen stability both per se and in admixture with detergent, cleaning and bleaching compositions. This high degree of stability is surprisingly achieved with a quantity of coating material of a few percent, based on sodium percarbonate. Although it was known that boric acids, borates and sodium perborate were extremely effective as coating components, the effectiveness of the peroxygen-containing boron compounds preferably used in accordance with the invention exceeds that of known boron compounds. The process according to the invention may be carried out very simply: by virtue of the very high solubility of perborax and other peroxygen-containing boron compounds to be used in accordance with the invention, an effective coating layer can be obtained in a single process step. In addition, there are no malfunctions attributable to blockage of the nozzle. The consumption of energy for drying is also kept very low.

The invention is illustrated by the following Examples.

EXAMPLE 1

Sodium percarbonate produced by reaction of soda with hydrogen peroxide in aqueous phase and having an active oxygen content ($O_a$) of 14.2% by weight was coated in a mixer with a solution containing perborax corresponding to the general formula $Na_2B_4O_7 \cdot 4H_2O_2$:

The coating solution is prepared by dissolving 100.2 g of borax ($Na_2B_4O_7 \cdot 10 H_2O$) in 115.4 g of a 35% by weight aqueous hydrogen peroxide solution with stirring and moderate spontaneous heating. The solution contains 41% by weight of $Na_2B_4O_7 \cdot 4H_2O$ and 2.2% by weight of $H_2O_2$. The atomic ratio of boron to active oxygen in the solution is 1:1.13.

1500 g of sodium percarbonate are sprayed with 183 g of the above-mentioned solution in a laboratory plough-share mixer and the moist product is dried at 60° C. in a fluidized bed dryer.

$O_a$ content of the coated sodium percarbonate: 14.4% by weight; boron content of the coated sodium percarbonate: 0.61% by weight, calculated from the quantity of $Na_2B_4O_7 \cdot 4H_2O_2$ applied and based on coated sodium percarbonate. The $O_a$ stability of the coated sodium percarbonate added to a commercial zeolite-containing detergent tower powder (Persil Supra TP)—15 parts by weight of coated sodium percarbonate and 85 parts by weight of tower powder—during storage of the mixture under humid conditions in detergent packs is shown in the Table.

EXAMPLE 2

Sodium percarbonate (according to Example 1) was sprayed with a perborax ($Na_2B_4O_7 \cdot 4H_2O_2$)-containing solution and simultaneously dried in a fluidized bed dryer.

The solution was prepared by dissolving borax in 19.5% by weight $H_2O_2$ solution. Content of $Na_2B_4O_7 \cdot 4H_2O_2$ 31.2% by weight; atomic ratio of boron to active oxygen 1:1. The solution was sprayed onto the percarbonate through a two-component nozzle at a fluidized bed temperature of 50° C. (entry temperature of the drying air 110° C.). The quantity sprayed corresponded to 5 parts by weight of perborax per 100 parts by weight of sodium percarbonate; $O_a$ content of the coated sodium percarbonate 14.2% by weight. The $O_a$ stability of the coated sodium percarbonate added to a detergent powder is shown in the Table (tower powder and mixing ratio as in Example 1).

EXAMPLE 3

Example 2 was repeated with the difference that the spray solution contained perborax with the formula $Na_2B_4O_7 \cdot 2 H_2O_2$; content 28.7% by weight; atomic ratio of boron to active oxygen 1:1.

Quantity of coating 5% by weight, based on sodium percarbonate. $O_a$ content of the coated sodium percarbonate 14.0% by weight. The $O_a$ stability in a detergent tower powder is again shown in the Table (tower powder and mixing ratio as in Example 1).

EXAMPLE 4

Centrifuge-moist sodium percarbonate—prepared by reaction of soda with hydrogen peroxide in aqueous phase in the presence of sodium chloride and sodium hexametaphosphate and crystallization—was aftertreated in the centrifuge by washing with a perborax solution (33% by weight, based on $Na_2B_4O_7 \cdot 4H_2O_2$) after removal of the mother liquor and subsequently dried in a fluidized bed dryer. The quantity of $Na_2B_4O_7 \cdot 4H_2O_2$ applied corresponded to 2.5% by weight, based on sodium percarbonate. The boron content was approximately 0.3% by weight. The $O_a$ content of the coated percarbonate was 14.2% by weight. The storage stability is shown in the Table.

COMPARISON EXAMPLE 1

Sodium percarbonate was coated with 5% by weight of orthoboric acid, based on sodium percarbonate, by the process according to DE-PS 28 00 916 (see Example A6 of this document). $O_a$ content of the coated sodium percarbonate 13.4% by weight; boron content, based on coated sodium percarbonate, 0.83% by weight. The stability data during storage in the detergent mixture are shown in the Table.

COMPARISON EXAMPLE 2

Sodium percarbonate was sprayed with an aqueous borax solution (concentration 35% by weight) in a mixer (as in Example 1), the quantity of borax sprayed on amounting to 5 parts by weight per 100 parts by weight of sodium percarbonate. The material was then dried at 70° C.

$O_a$ content 13.5% by weight; boron content of the coated percarbonate 0.55% by weight, calculated from the borax applied on the assumption that borax was converted into $Na_2B_4O_7 \cdot 5H_2O$ during drying.

COMPARISON EXAMPLE 3

Sodium percarbonate was coated with sodium perborate and waterglass in accordance with DE-PS 28 10 379. The quantity of coating corresponded to 6% by weight of sodium perborate monohydrate and 1% by weight of waterglass. $O_a$ content of the coated sodium percarbonate 14.3% by weight; boron content of the coated sodium percarbonate (calculated from the quantity of $NaBO_2 \cdot H_2O_2$ applied) 0.62% by weight. The stability data in a detergent composition are shown in the Table.

To evaluate stability, coated sodium percarbonate of the Examples and Comparison Examples was stored in admixture with a commercial phosphate-free but zeolite-containing detergent tower powder (Persil Supra TP)—mixing ratio 15:85—in sealed detergent packs (0.4 l) placed in a climatic chamber at a constant 30° C./80% relative humidity. The results of the active oxygen measurements of the mixtures carried out in the usual way at the beginning and after storage for 2, 4 and 8 weeks are shown in the Table. For substantially the same boron content, sodium percarbonate particles coated in accordance with the invention show a higher stability in storage than the sodium percarbonate particles coated with boric acid, borax or perborate monohydrate.

said coating material containing at least one peroxygen-containing boron compound, wherein said coating material comprises 1–30% by weight based on sodium percarbonate;

wherein said peroxygen-containing boron compound comprises one or more reaction products of a dialkali metal tetraborate and hydrogen peroxide, or alkali metal pentaborate and hydrogen peroxide and wherein said peroxygen-containing boron compound in the coating is a perborax with the general formula $Na_2B_4O_7 \cdot n\ H_2O_2 \cdot m\ H_2O$ where n is an integer of 1–4 and m is an integer of 0–9.

2. Coated sodium percarbonate particles as in claim 1, wherein n is an integer of 2–4 and m is an integer of 0–2.

3. Coated sodium percarbonate particles as in claim 1, wherein said coating material comprises 1–10% by weight based on sodium percarbonate.

4. Coated sodium percarbonate particles as in claim 1, wherein said coating material comprises 2–6% by weight based on sodium percarbonate.

5. Coated sodium percarbonate particles as in claim 1, wherein said coating material comprises more than 50 by weight of the reaction products of dialkali metal tetraborate and hydrogen peroxide, or alkali metal pentaborate and hydrogen peroxide and less than 50% by weight of other stabilizing compounds.

6. Coated sodium percarbonate particles as in claim 1, wherein said coating material comprises more than 70% by weight of the reaction products of dialkali metal tetraborate and hydrogen peroxide, or alkali metal pentaborate and hydrogen peroxide and less than 30% by weight of other stabilizing compounds.

TABLE

| | | | (stability in storage) | | | | |
|---|---|---|---|---|---|---|---|
| | Coating substance quantity | Bulk density of coated sodium per- | $O_a$ (% by weight) absolute of the sodium percarbonate in the detergent composition | | | | Residual $O_a$ (%) |
| | (% by weight) | carbonate (g/l) | Start | 2 W. | 4 W. | 8 W. | after 8 weeks |
| Example No. | | | | | | | |
| 1 | $Na_2B_4O_7 \cdot 4H_2O_2$ 5% | 1050 | 14.4 | 13.8 | 13.7 | 12.5 | 86.8 |
| 2 | $Na_2B_4O_7 \cdot 4H_2O_2$ 5% | 970 | 14.2 | 13.9 | 12.6 | 11.5 | 80.9 |
| 3 | $Na_2B_4O_7 \cdot 2H_2O_2$ 5% | 990 | 14.0 | 13.3 | 12.9 | 11.2 | 80 |
| 4 | $Na_2B_4O_7 \cdot 4H_2O_2$ 2.5% | 920 | 14.2 | 13.9 | 12.8 | 10.9 | 76.7 |
| Comparison Examples | | | | | | | |
| CE 1 | $B(OH)_3$ 5% | 970 | 13.4 | 12.7 | 11.3 | 8.3 | 61.9 |
| CE 2 | $Na_2B_4O_7 \cdot 10H_2O$ 5% | 960 | 13.5 | 12.3 | 11.9 | 9.6 | 71 |
| CE 3 | $NaBO_2 \cdot H_2O_2$ 6% | 940 | 14.3 | 13.3 | 12.8 | 10.0 | 70 |

We claim:

1. Coated sodium percarbonate particles comprising a core;

a coating material that coats the surface of said core;

said core consisting essentially of sodium percarbonate;

7. A detergent, cleaning, or bleaching composition containing coated sodium percarbonate particles as in claim 1.

8. A process for producing coated sodium percarbonate articles comprising forming a coating composition have one or more coating components;

applying said coating composition to particles consisting essentially of sodium percarbonate; and forming cores of sodium percarbonate coated by said coating;

wherein said coating comprises at least one peroxygen-containing boron compound;

wherein said peroxygen-containing compound comprises the reaction products of hydrogen peroxide and dialkali metal tetraborate, or hydrogen peroxide and alkali metal pentaborate;

wherein said at least one of said peroxygen containing boron reaction products in a perborax with the general formula $Na_2B_4O_7 \cdot m\ H_2O$ wherein n is an integer of 1–4 and m is an integer of 0–9; and wherein said coating material comprises 1–30% by weight based on sodium percarbonate.

9. A process for producing coated sodium percarbonate particles as in claim 8 wherein an aqueous solution of said coating material is obtained, said process further comprising drying said coated sodium percarbonate particles at 30°–90° C.

10. The process for producing coated sodium percarbonate particles according to claim 9 wherein said aqueous solution contains boron and active oxygen in an atomic ratio of 1:0.2 to 1:1.5.

11. The process for producing coated sodium percarbonate particles according to claim 9 wherein said aqueous solution contains boron and active oxygen in an atomic ratio of 1:0.5 to 1:1.25.

12. The process for producing coated sodium percarbonate particles according to claim 9 wherein n in said general formula is an integer of 2–4.

13. The process for producing coated sodium percarbonate particles according to claim 12 wherein said solution contains 20–50% by weight of said perborax.

14. The process for producing coated sodium percarbonate particles according to claim 13 wherein said solution contains 25–40% by weight of said perborax.

15. The process for producing coated sodium percarbonate particles according to claim 9 further comprising spraying said aqueous solution containing said peroxygen-containing boron compound onto said particles consisting essentially of sodium percarbonate.

16. Coated sodium percarbonate particles prepared by a process comprising reacting an aqueous solution of aqueous hydrogen peroxide and dialkali metal tetraborate, or aqueous hydrogen peroxide and alkali metal pentaborate to form peroxygen-containing boron reaction products;

forming a coating material having at least one of said peroxygen-containing boron reaction products applying said coating material to particles consisting essentially of sodium percarbonate to form coated sodium percarbonate particles, wherein each of said particles has a core consisting essentially of sodium percarbonate coated by said coating material, wherein said at least one of said peroxygen-containing boron reaction products is a perborax with the general formula $Na_2B_4O_7 \cdot m\ H_2O_2 \cdot m\ H_2O$ where n is an integer of 1–4 and m is an integer of 0–9, and wherein said coating material comprises 1–30% by weight based on sodium percarbonate and drying said coated particles at a temperature in the range of 30°–90° C.

17. Coated sodium percarbonate particles prepared by the process in claim 16 wherein n is an integer of 2–4 and m is an integer of 0–2.

18. Coated sodium percarbonate particles prepared by the process according to claim 17 wherein said solution contains 20–50% by weight of said perborax.

19. Coated sodium percarbonate particles prepared by the process according to claim 18 wherein said solution contains 25–40% by weight of said perborax.

20. Coated sodium percarbonate particles prepared by the process in claim 16 wherein said coating comprises 1–10% by weight based on sodium percarbonate.

21. Coated sodium percarbonate particles prepared by the process in claim 16 wherein said coating material comprises 2–6% by weight based on sodium percarbonate.

22. Coated sodium percarbonate particles prepared by the process in claim 16 wherein said coating comprises more than 50% by weight of the reaction products of dialkali metal tetraborate and hydrogen peroxide, or alkali metal pentaborate and hydrogen peroxide and less than 50% by weight of other stabilizing compounds.

23. Coated sodium percarbonate particles prepared by the process in claim 16 wherein said coating comprises more than 70% by weight of the reaction products of dialkali metal tetraborate and hydrogen peroxide, or alkali metal pentaborate and hydrogen peroxide and less than 30% by weight of other stabilizing compounds.

24. Coated sodium percarbonate particles prepared by the process according to claim 16 wherein said aqueous solution contains boron and active oxygen in an atomic ratio of 1:0.2 to 1:1.5.

25. Coated sodium percarbonate particles prepared by the process according to claim 16 wherein said aqueous solution contains boron and active oxygen in an atomic ratio of 1:0.5 to 1:1.25.

26. Coated sodium percarbonate particles prepared by the process according to claim 16 further comprising spraying said aqueous solution containing said peroxygen-containing boron compound onto said particles consisting essentially of sodium percarbonate.

27. Detergent, cleaning, and bleaching compositions containing coated sodium percarbonate particles prepared from the process according to claim 16.

* * * * *